US012744779B2

(12) United States Patent
Selesi et al.

(10) Patent No.: US 12,744,779 B2
(45) Date of Patent: Sep. 22, 2026

(54) GRANULAR ADMINISTRATOR APPROVAL OF USER COMMANDS AND ACTIONS IN REMOTE ACCESS SESSIONS

(71) Applicant: Cisco Technology, Inc., San Jose, CA (US)

(72) Inventors: Aaron Selesi, Simi Valley, CA (US); Sravanth Yajamanam, San Jose, CA (US); Michael Freed, Pleasanton, CA (US); Ryan Holland, Pacifica, CA (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 18/631,160

(22) Filed: Apr. 10, 2024

(65) Prior Publication Data

US 2025/0323915 A1 Oct. 16, 2025

(51) Int. Cl.
*H04L 9/40* (2022.01)

(52) U.S. Cl.
CPC .................................... *H04L 63/10* (2013.01)

(58) Field of Classification Search
CPC ........................................................ H04L 63/10
See application file for complete search history.

(56) References Cited

U.S. PATENT DOCUMENTS 9,538,376 B2 * 1/2017 Lehtinen ............... H04L 63/306
9,779,222 B2 * 10/2017 Borkar .................... H04L 67/06
10,091,239 B2 * 10/2018 Ylonen ................. H04L 63/164
2005/0138426 A1 * 6/2005 Styslinger ........... H04L 63/0281 709/224
2010/0281173 A1 11/2010 Vutukuri et al.
2013/0191631 A1 * 7/2013 Ylonen ................. H04L 63/164 713/153
2015/0030313 A1 * 1/2015 Tammisalo ............. G06F 16/30 386/278
2016/0182487 A1 6/2016 Zhu et al.
2019/0311093 A1 10/2019 Moloian et al.
2020/0014726 A1 1/2020 Hasson et al.
2021/0044595 A1 2/2021 Childress et al.
2023/0093882 A1 * 3/2023 Waters .................. H04L 63/105 726/28

* cited by examiner

*Primary Examiner* — Michael R Vaughan
(74) *Attorney, Agent, or Firm* — Lee & Hayes, P.C.

(57) ABSTRACT

In one embodiment, a method for granular administrator approval of user commands and actions in remote access sessions includes providing, by a device, a remote access session to a remote device for both a user device and an overseeing device. The overseeing device may display user device actions on the remote access session. In addition, such methods can further include determining, by the device, a set of permitted actions and a set of restricted actions that the user device is allowed to perform on the remote device in the remote access session, allowing, by the device, user device actions when permitted, and requesting by the device, real-time permission from the overseeing device when user device action is restricted.

20 Claims, 6 Drawing Sheets

GRANULAR ADMINISTRATOR APPROVAL OF USER COMMANDS AND ACTIONS IN REMOTE ACCESS SESSIONS

TECHNICAL FIELD

The present disclosure relates generally to computer networks, and, more particularly, to granular administrator approval of user commands and actions in remote access sessions.

BACKGROUND

Typically, Internet-of-Things (IoT) remote access solutions provide system administrators ("admins") access control, allowing them to grant technicians ("users") specific permission to access specific devices. Once permissions are granted, users can freely connect to and interact with the specified assets. However, certain assets may demand a higher level of security against potentially dangerous user actions, either malicious or mistaken.

In order to protect these assets from potentially dangerous user interactions, some approaches may allow an admin to configure several static constraints, such as limiting access to certain ports, protocols, or files prior to the user opening the remote access session. In other approaches, an admin may have the ability to monitor (view user activity in real time) or terminate the remote session (fully revoke access permissions) after the user opens the remote access session.

As opposed to the options listed above, admins might want to control, limit, or allow specific user actions or commands in real-time. In most systems, if an admin observes any potentially dangerous user behavior, the only possible response is to explicitly close the session, block the user, reconfigure permissions, and re-grant access. This overly tedious process constitutes a bad user experience for both admins, who must manually execute the aforementioned steps, and users, who may experience frequent interruptions.

One approach that seeks to provide for real-time control is the "highlight-and-communicate" approach. In this approach, a user and admin join one remote session concurrently. Users are allowed to view the remote asset user interface (UI), but are prevented from typing, clicking, or interacting with the session in any way. Instead, users are only allowed to highlight portions of the screen and communicate to an admin, either orally or via text, what action needs to occur (e.g., type a command, click a certain element, delete that file, etc.). Then, the admin must execute each action themselves.

Unfortunately, this process is tedious and error prone. The onus of crafting actions is placed on the admin, but the user is likely the individual who knows exactly which actions need to occur. If a certain command is communicated incorrectly by the user, or typed incorrectly by the admin, an improper action may occur, which may require multiple retries or require additional actions to undo. Furthermore, many complex actions may be extremely difficult to articulate or convey. Alternatively, actions may be so common or simple that they are easily identified as innocuous, yet these actions still must be communicated to and executed by an admin. The "highlight-and-communicate" solution certainly improves the security of remote access sessions, but even the simplest tasks can easily become lengthy and frustrating, wasting time and effort on the behalf of both users and admins.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

According to one or more embodiments of the disclosure, a method for granular administrator approval of user commands and actions in remote access sessions includes providing, by a device, a remote access session to a remote device for both a user device and an overseeing device. The overseeing device may display user device actions on the remote access session. In addition, such methods can further include determining, by the device, a set of permitted actions and a set of restricted actions that the user device is allowed to perform on the remote device in the remote access session, allowing, by the device, user device actions when permitted, and requesting by the device, real-time permission from the overseeing device when user device action is restricted.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
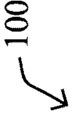
FIG. 1 illustrates an example computing system.
Figure 1:
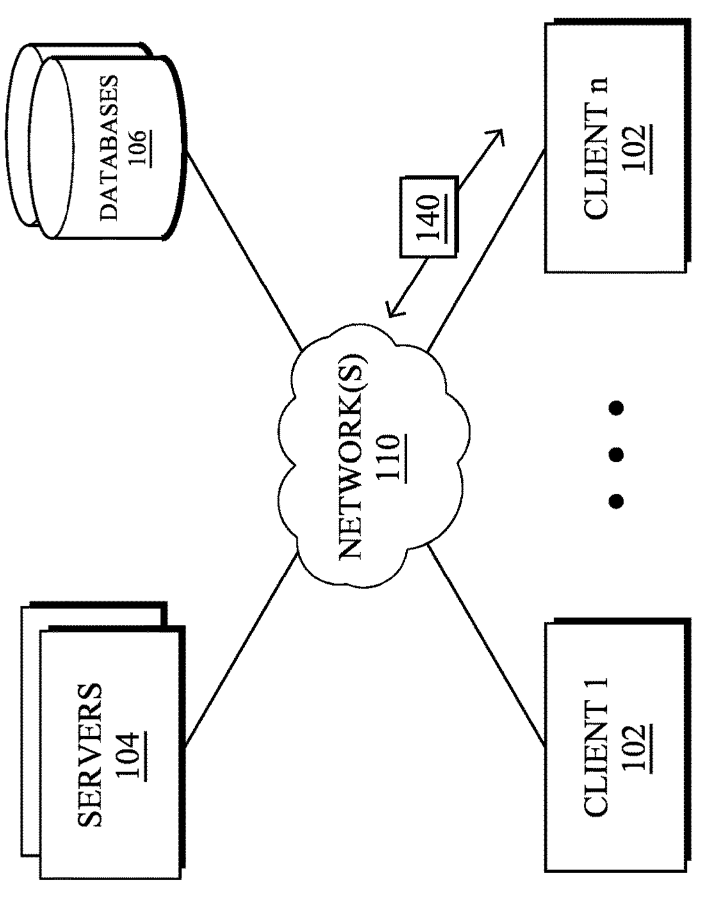

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
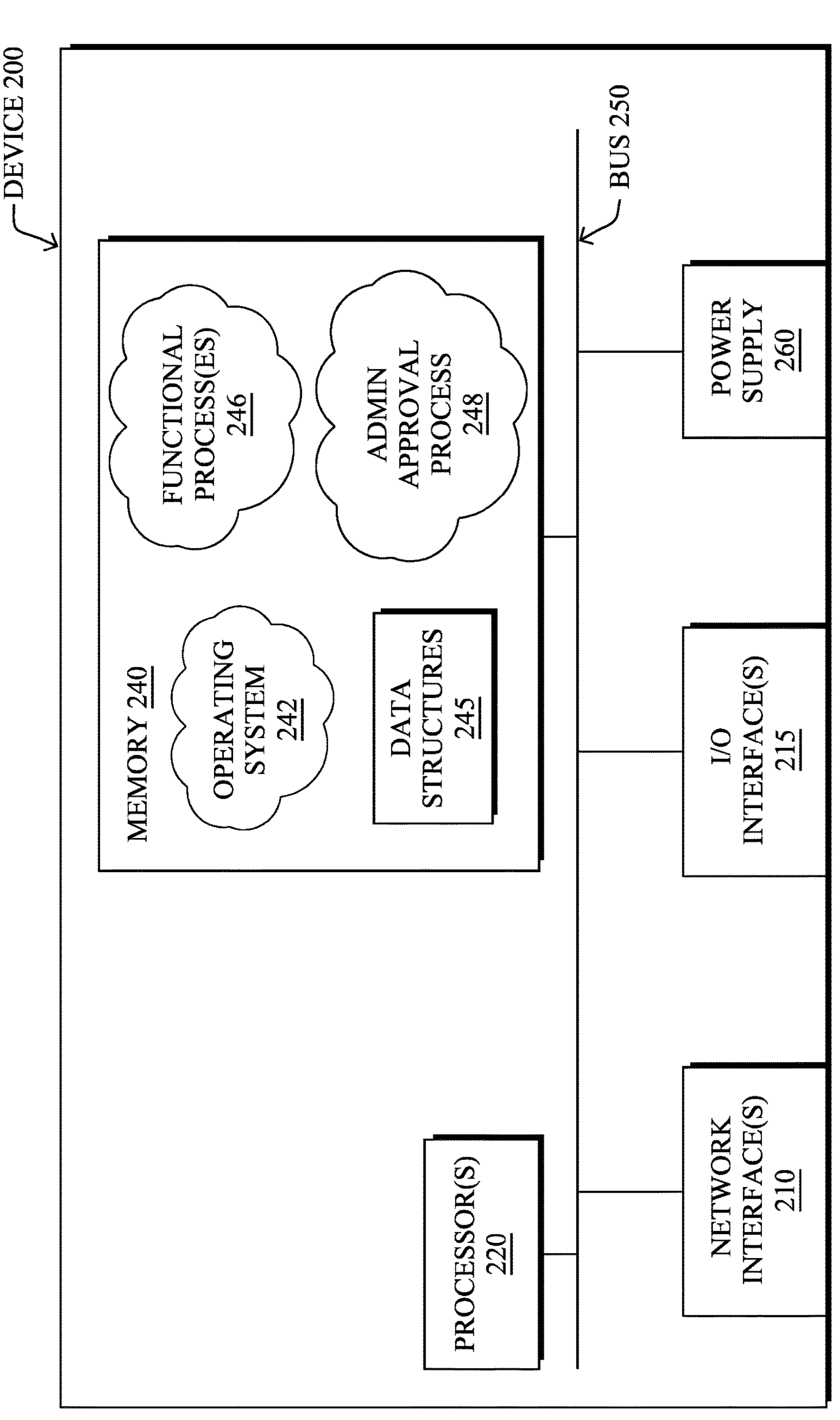
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, an admin approval process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, admin approval process (process 248) may include computer executable instructions that, when executed by processor(s) 220, cause device 200 to perform the techniques described herein. To do so, in some implementations, process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

Granular Administrator Approval of User Commands and Actions in Remote Access Sessions As noted above, typical IoT Remote Access solutions provide system administrators (admins) some remedial level of access control, thereby allowing the admin to grant technicians (users) very specific permission to access specific devices. Once these permissions are granted, users can generally freely connect to and interact with the specified assets. However, certain assets may demand a higher level of security against potentially dangerous user actions, either malicious or mistaken. Currently, common admin options for oversight are sparce:

1. Prior to a user opening a remote session, admins may be able to configure a few additional static constraints, such as limiting access to certain ports, protocols, or files.
2. After a user opens a remote session, admins may have the ability to monitor (view user activity in real time) or terminate the remote session (fully revoke access permissions).

As opposed to the options listed above, admins might want to control, limit, or allow specific user actions or commands in real-time. In most systems, if an admin observes any potentially dangerous user behavior, the only possible response is to explicitly close the session, block the user, reconfigure permissions, and re-grant access. This overly tedious process constitutes a bad user experience for both admins, who must manually execute the aforementioned steps, and users, who may experience frequent interruptions.

Some other solutions for real-time control include the "highlight-and-communicate" approach mentioned above:

1. This solution relies on a user and admin joining one remote session concurrently.

2. Users are allowed to view the remote asset UI, but are prevented from typing, clicking, or interacting with the session in any way. Instead, users are only allowed to highlight portions of the screen and communicate to an admin, either orally or via text, what action needs to occur (i.e., type a command, click a certain element, delete that file).
3. Then, the admin must execute each action themselves.

Unfortunately, this process is tedious and error prone. The onus of crafting actions is placed on the admin, but the user is likely the individual who knows exactly which actions need to occur. If a certain command is communicated incorrectly by the user, or typed incorrectly by the admin, an improper action may occur, which may require multiple retries or require additional actions to undo. Furthermore, many complex actions may be extremely difficult to articulate or convey. Alternatively, actions may be so common or simple that they are easily identified as innocuous, yet these actions still must be communicated to and executed by an admin. The "highlight-and-communicate" solution certainly improves the security of remote access sessions, but even the simplest tasks can easily become lengthy and frustrating, wasting time and effort on the behalf of both users and admins.

The techniques herein provide implementation of real-time granular admin approval of user behavior during remote access sessions by intercepting user actions and determining whether to allow such actions or restrict such actions until overseeing admin approval is received.

As described in more detail herein, the techniques presented herein provide for the implementation of real-time granular admin approval of user behavior, thereby providing an alternative solution that maintains remote session security while addressing many of the shortcomings present in the existing "highlight-and-communicate" approaches described above.

As an example, the techniques described herein may allow for a user and an admin to join one remote session concurrently. The admin may view the same screen as the user, but the admin view may be enhanced with visual and/or textual indication of user actions occurring onscreen. However, instead of merely being allowed to perform operations such as highlighting in the aforementioned approaches, the user may be given permission to click, drag, type, etc. in the remote session. For example, implementations herein may allow for low-level user-computer interactions to be intercepted and "almost" allowed to be executed.

Non-limiting examples of such low-level user-computer interactions can include:

Clicks: the admin can see a colored dot at the location where a user clicked;

Drags: for applicable sessions (RDP, Web) not applicable for terminals (SSH);

Keystrokes: including keyboard shortcuts (i.e., copy-and-paste) and commands; and/or Text inputs.

With respect to specific critical subset(s) of these actions, the user may be allowed to "almost" execute the non-limiting actions mentioned above, however, before any such actions are actually executed, the admin must explicitly approve the action, either by pressing enter or clicking "Approve" or "Deny" onscreen. For example, a left click operation may be permitted, while a right click operation may not be permitted for the user until the admin approves the "non-permitted" operation. As another example, a move mouse operation may be permitted without admin approval, etc. In addition, certain text entered by the user may be allowed without admin interaction while other text entries may be restricted for the user without admin confirmation, etc.

That is, as mentioned above, the techniques herein may ask a user and admin to join one remote session concurrently. The admin may view the same screen as the user, however, in contrast to previous approaches, the admin view herein may be enhanced with visual and/or textual indication of user actions occurring onscreen.

Specifically, according to one or more embodiments of the disclosure as described in detail below, an exemplary method in accordance with the disclosure includes providing, by a device, a remote access session to a remote device for both a user device and an overseeing device. The overseeing device may display user device actions on the remote access session. In addition, such methods can further include determining, by the device, a set of permitted actions and a set of restricted actions that the user device is allowed to perform on the remote device in the remote access session, allowing, by the device, user device actions when permitted, and requesting by the device, real-time permission from the overseeing device when user device action is restricted.

Figure 3:
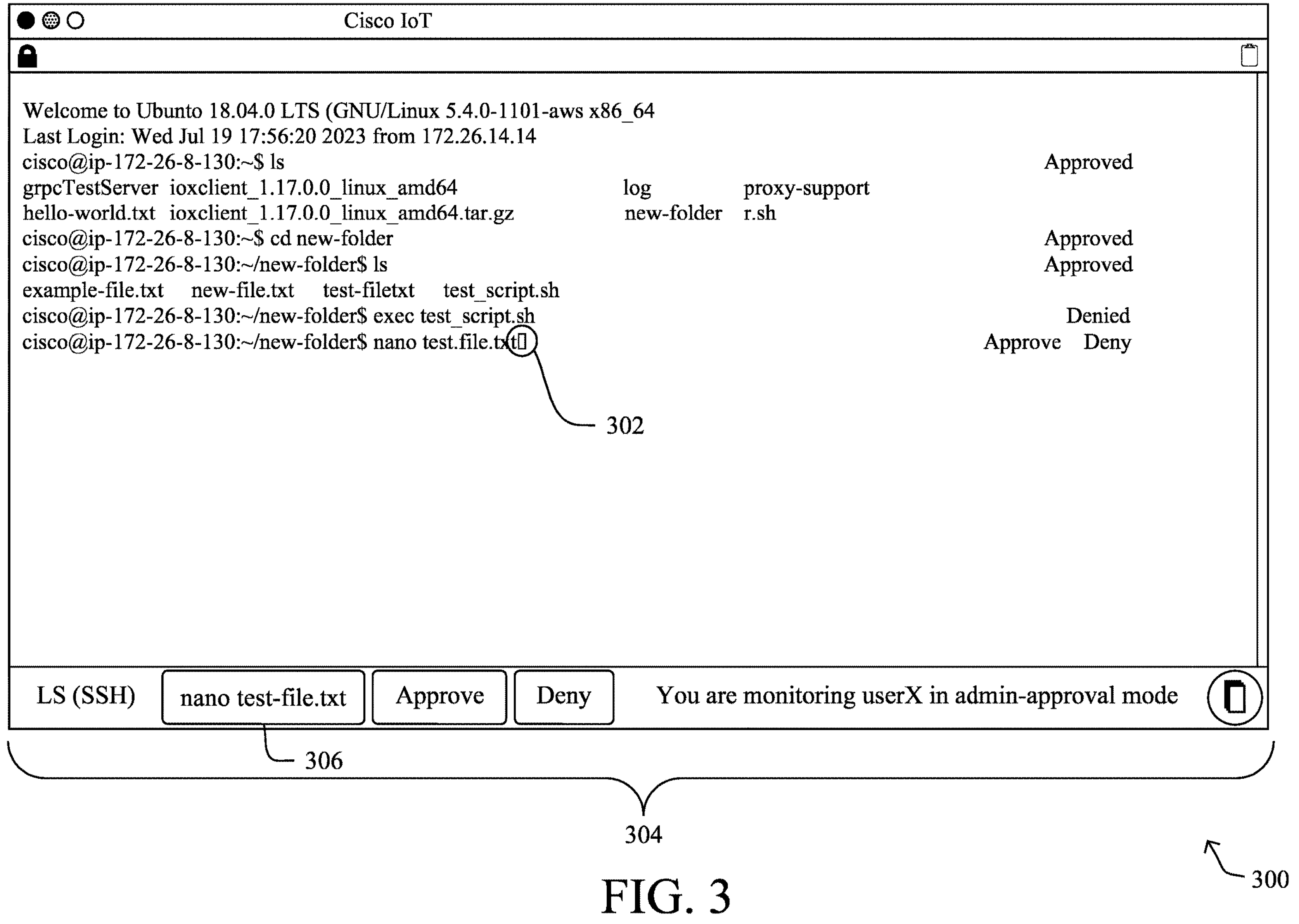
FIG. 3 illustrates an example of a terminal-based session for granular administrator approval of user commands and actions in remote access sessions in accordance with the present disclosure.

Operationally, FIG. 3 illustrates an example of a terminal-based session 300 for granular administrator approval of user commands and actions in remote access sessions in accordance with the present disclosure. The terminal-based session 300 can be a secure shell (SSH) protocol session whereby commands are securely sent across an unsecured network through the utilization of authenticated and encrypted connections between devices in the network.

In a non-limiting example, a remote user (e.g., an expert user) is accessing an asset via the terminal-based session 300 (e.g., via SSH). The user may be allowed to type, but any attempt to push enter, execute a typed command, etc. may be redirected to the admin for approval.

In the example of FIG. 3, a cursor position 302 (e.g., a cursor position of the user) can be shown on the terminal-based session 300. In addition, the terminal-based session 300 can include a banner 304 that can be viewed by the admin. The banner 304 can include various functional buttons, such as "approve" and "deny," as well as including a field 306 that indicates a command (or other operation) that the user is attempting to execute. In the non-limiting example of FIG. 3, the field 306 shows that the user is attempting to execute an operation that calls "nano test-file.txt," although it will be appreciated that implementations are not limited to this exemplary command.

In this example, the admin may be allowed to approve execution of user-initiated operations (e.g., commands, etc.) via the in-terminal buttons, such as the "approve" or "deny" buttons, options provided on the banner 304, and/or inputs from a peripheral device accessible to the admin, such as a keyboard, pointing device (e.g., a mouse), etc. In addition, in some implementations, the admin may be able to view the approval and/or denial status of past actions in the terminal-based session 300.

Figure 4:
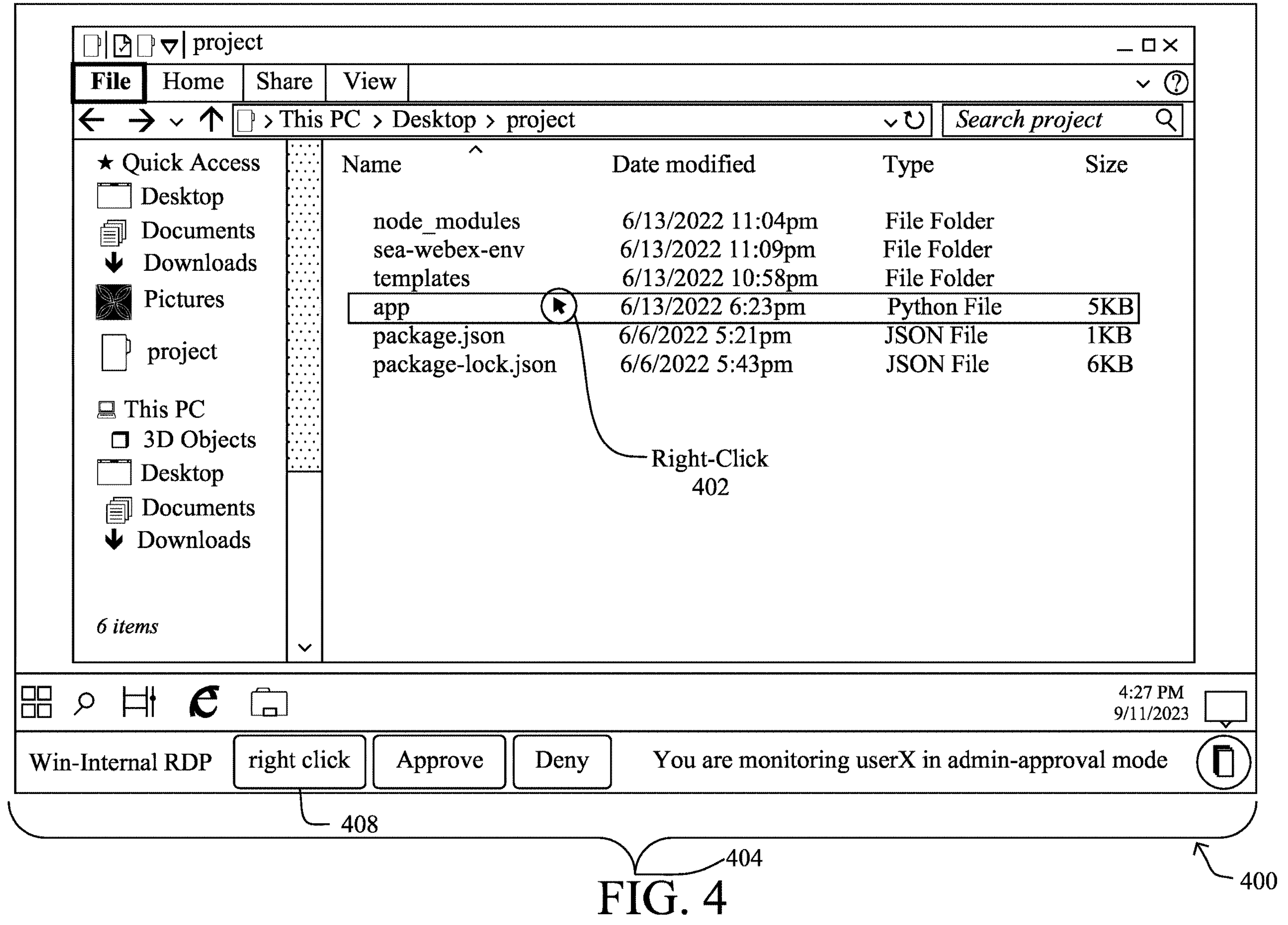
FIG. 4 illustrates an example of a browser-based session for granular administrator approval of user commands and actions in remote access sessions in accordance with the present disclosure.

FIG. 4 illustrates an example of a browser-based session 400 for granular administrator approval of user commands and actions in remote access sessions in accordance with the present disclosure. The browser-based session 400 may operate according to a remote desktop protocol (RDP), WebApp, or other suitable browser-based session.

In a non-limiting example, a remote user (e.g., an expert user) is accessing an asset via the browser-based session 400 form from within a remote access session. The user may be allowed to type, select, and/or specify input for multiple fields, but the final action of submitting the form is redirected to the admin for approval.

In this example, a cursor position 402 (e.g., a cursor position of the user) can be shown on the browser-based session 400. In addition, the browser-based session 400 can include a banner 404 that can be viewed by the admin. The banner 404 can include various functional buttons, such as "approve" and "deny," as well as including a field 408 that indicates a command (or other operation) that the user is attempting to execute. In the non-limiting example of FIG. 4, the field 408 shows that the user is attempting to execute a "right click" operation, although it will be appreciated that implementations are not limited to this exemplary command.

In this example, the admin may be allowed to approve execution of user-initiated operations (e.g., commands, etc.) via the options provided on the banner 404, such as the "approve" or "deny" buttons, and/or inputs from a peripheral device accessible to the admin, such as a keyboard, pointing device (e.g., a mouse), etc. In addition, in some implementations, the admin may be able to view the approval and/or denial status of past actions in the browser-based session 400.

Figure 5:
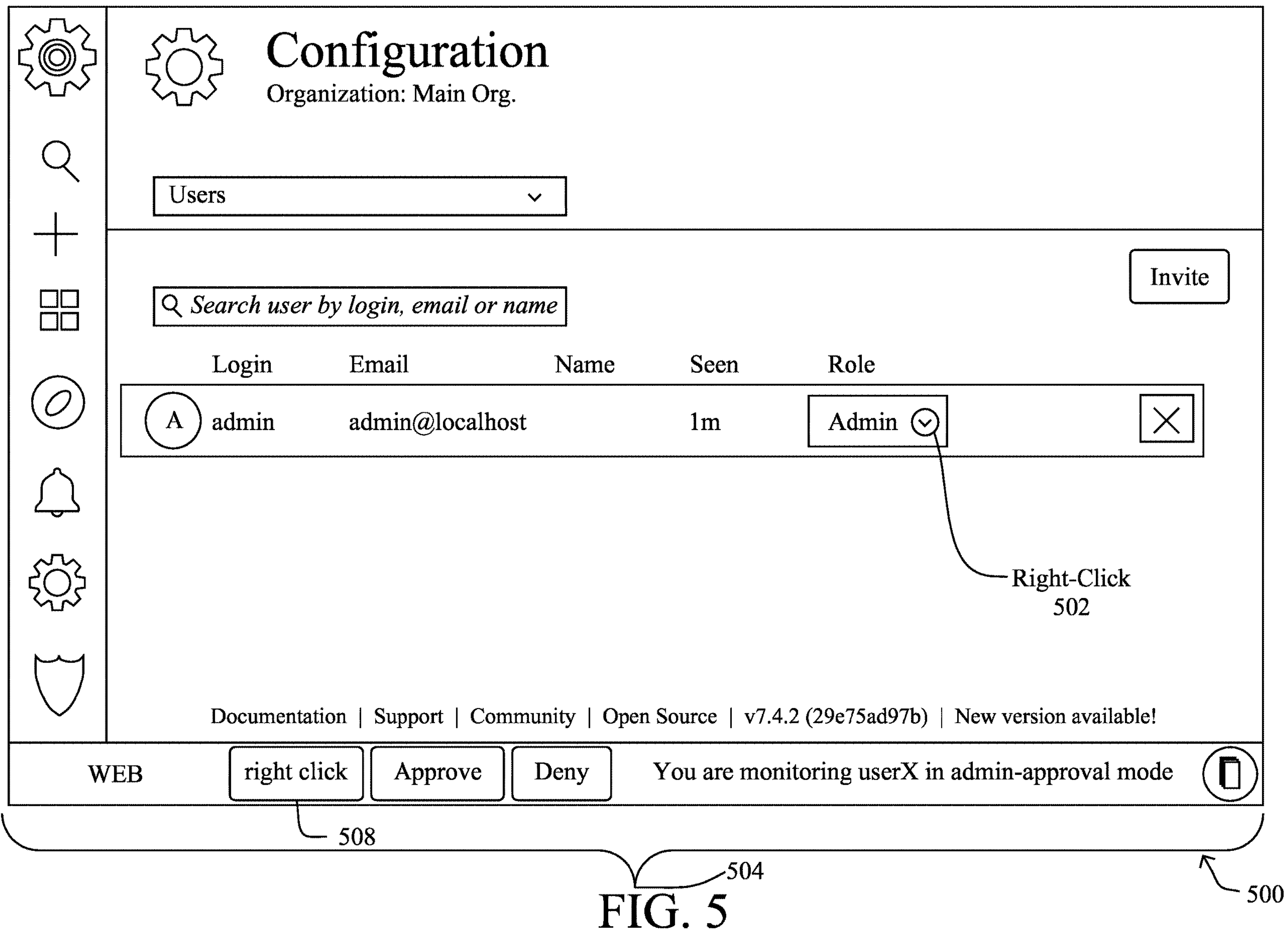
FIG. 5 illustrates an example of a human machine interface for granular administrator approval of user commands and actions in remote access sessions in accordance with the present disclosure.

FIG. 5 illustrates an example of a human machine interface 500 for granular administrator approval of user commands and actions in remote access sessions in accordance with the present disclosure.

In a non-limiting example, a remote user (e.g., an expert user) is accessing a remote asset via the human machine interface 500 (e.g., via a human machine interface (HMI)). The user may be allowed to open, close, drag, and/or type within the HIM. However, any attempts to edit files, enter commands, start/stop programs, etc. are redirected to admin for approval.

In the foregoing examples illustrated in FIG. 3, FIG. 4, and/or FIG. 5, instead of discussing exactly which action needs to occur, as required by current approaches described above, the user can simply initiate the action themselves, and the admin's work may be reduced to a single action, such as a click on a pointing device, keyboard, or other suitable peripheral computing device (e.g., to approve or deny such actions). By shifting the responsibility of crafting actions back to the user and replacing the arduous communication step with a simple approval click, aspects of the present disclosure reduce risks, execution time, and/or user frustration. Furthermore, while the "base-level" approach described herein greatly streamlines the process, it also provides additional opportunities to optimize oversight in ways never possible with the "highlight-and-communicate" approaches mentioned above, as well as other current paradigms.

In some implementations, various configuration and/or approval mechanism are contemplated within the scope of the disclosure. One such example of a configuration mechanism that is contemplated herein may be a "static pre-configuration" mechanism. Such "static pre-configuration" mechanisms can involve enhancement of admin level approval by leveraging static rules.

For example, an admin may be provided with the power to whitelist specific actions to be automatically approved, such as common SSH commands like "1s." In this example, these actions would not require any manual admin approval, thereby reducing unnecessary lag time and/or unnecessary burden to the admin. This is in contrast to the existing "highlight-and-communicate" approach, where it may not be possible to automatically allow user actions, as the user is not allowed to click or type at all. Advantageously, by enabling at least a subset of whitelisted interactions, aspects of the present disclosure our can allow expedition of the overall process, which can, in turn, lead to a better experience for both users and admins while eliminating the risk of security issues that can arise from incorrect inputs, whether nefarious or otherwise.

Another mechanism contemplated herein may be an "automated approval" mechanism. Such "automated approval" mechanisms may allow for condensing the abstract process of communicating and discussing potential actions into a clean, discrete approval process. For example, in some implementations, each suggested action can be associated with a distinct binary response (e.g., either yes or no), effectively building a data set of user actions and commands with a dependent, predictable variable of admin approval or denial. Machine learning models can be employed then to analyze these data sets, as well as to consider other variables (i.e., previous commands, state of the system, user and device metadata, etc.) in order to predict whether an admin would approve or deny certain suggested actions. Given a data set of sufficient size and/or given sufficient iteration, admin approval of the user actions as discussed herein may therefore be partially or fully automated.

Notably, the granular control of user actions during a session can be based on particular customers, access levels, classes, and so on (e.g., some user can have access to all or some operations, some users cannot have the same levels of access, etc.). Additionally, the techniques herein may be based on no configuration (e.g., standard policies/rules) or else may be set by the admins in advance or even dynamically during a session, as discussed above.

Figure 6:
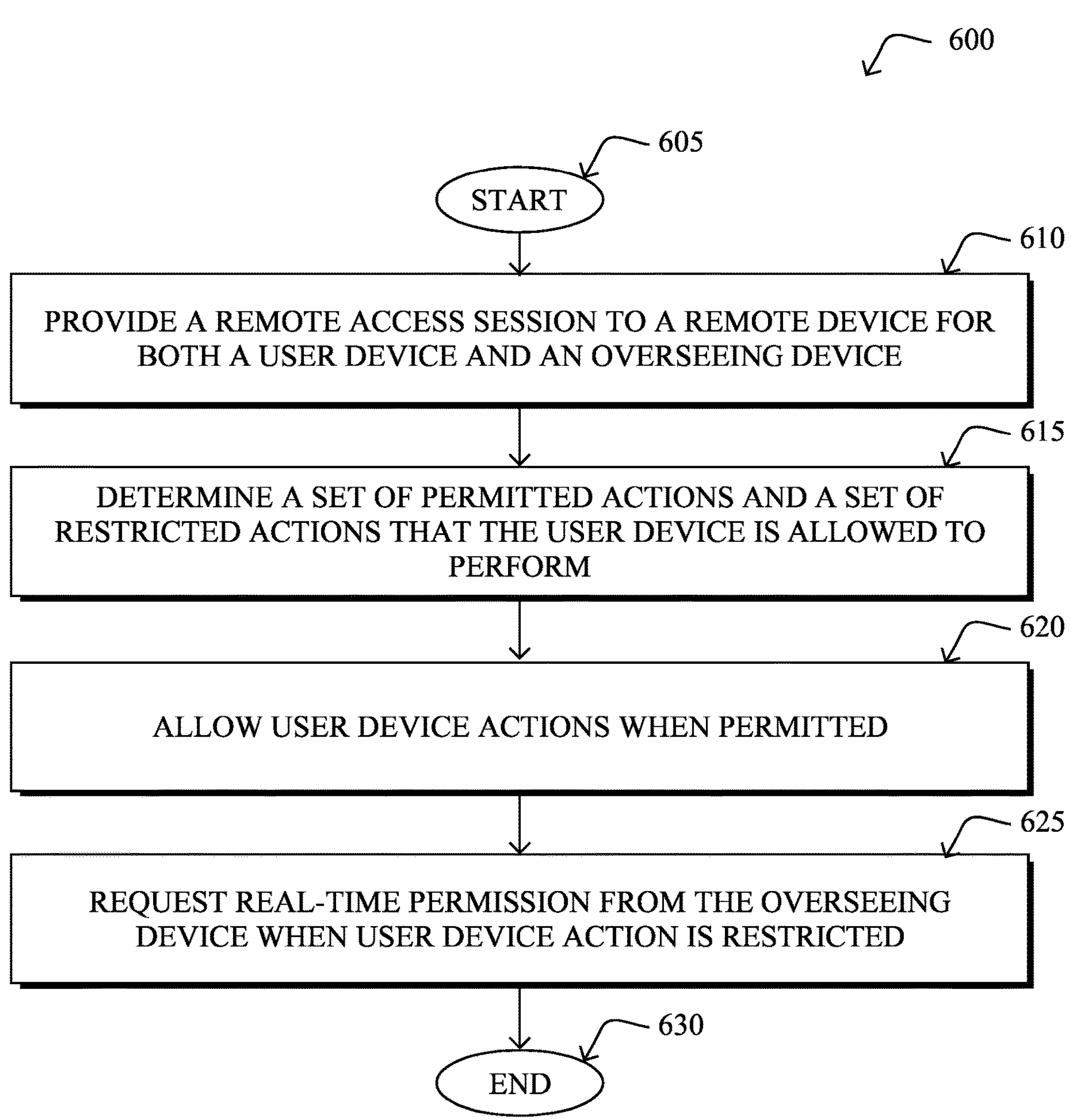
FIG. 6 illustrates an example procedure for granular administrator approval of user commands and actions in remote access sessions in accordance with the present disclosure.

In closing, FIG. 6 illustrates an example simplified procedure for granular administrator approval of user commands and actions in remote access sessions in accordance with one or more implementations described herein. For example, a non-generic, specifically configured device (e.g., device 200, an apparatus) may perform procedure 600 by executing stored instructions (e.g., process 248). The procedure 600 may start at step 605, and continues to step 610, where, as described in greater detail above, a device provides a remote access session to a remote device for both a user device and an overseeing device. In some implementations, the overseeing device displays user device actions on the remote access session. The device may be a remote access control device, HMI, laptop, desktop computer, or other suitable computing device.

The procedure 600 may continue to step 615 where, as described in greater detail above, the device may determine a set of permitted actions and a set of restricted actions that the user device is allowed to perform on the remote device in the remote access session. In some implementations, the set of permitted actions may include keyboard actions performed by the user device, mouse drags performed by the user device, or both. Further, in some implementations, the set of restricted actions are selected from a group consisting of: a type of mouse click input, an instruction to submit a command, an instruction to execute a command, an instruction to start a program, an instruction to stop a program, an instruction to edit a file, and an instruction to submit a form.

As mentioned above, wherein the set of permitted actions and the set of restricted actions can be based in part on administrator-defined rules. Implementations are not so limited, however, and in some implementations, the set of permitted actions and the set of restricted actions can be based in part on a machine learning model that is trained on approvals and denials of requested permissions over time.

The procedure 600 may continue to step 620 where, as described in greater detail above, the device may allow user device actions when permitted. In some implementations, the procedure 600 may include approving the user device actions based on the overseeing device providing permission or denying the user device actions based on the admin device not providing permission.

The procedure 600 may continue to step 625 where, as described in greater detail above, the device may request real-time permission from the overseeing device when user device action is restricted. In some implementations, the real-time permission from the overseeing device is selected from a group consisting of: a user of the overseeing device performing a mouse click operation, a user of the overseeing device performing a key stroke operation, a user of the overseeing device selecting an approve action, and a user of the overseeing device selecting a deny action.

In some implementations, the user device displays a view of an interface associated with the remote device and/or the overseeing device displays the view of the interface associated with the remote device with enhanced contextual information. In such implementations, the enhanced contextual information may include a banner that tracks movements performed by the user device or actions performed by the user device, or both. Implementations are not so limited, however, and the enhanced contextual information may include visual indicators or textual indications, or both, of actions performed by the user device, and/or a historical account of past actions performed by the user device. In yet other implementations, the enhanced contextual information is selected from a group consisting of: colored dots for clicks, keyboard commands, keyboard shortcuts, mouse drags, mouse actions, and information on actions inputted to the user device.

Procedure 600 may end at step 630.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: provide a remote access session to a remote device for both a user device and an overseeing device, wherein the overseeing device displays user device actions on the remote access session; determine a set of permitted actions and a set of restricted actions that the user device is allowed to perform on the remote device in the remote access session; allow user device actions when permitted; and request real-time permission from the overseeing device when user device action is restricted.

In still other implementations, a tangible, non-transitory, computer-readable medium storing program instructions that cause a device to execute a process comprising: providing a remote access session to a remote device for both a user device and an overseeing device, wherein the overseeing device displays user device actions on the remote access session; determining a set of permitted actions and a set of restricted actions that the user device is allowed to perform on the remote device in the remote access session; allowing user device actions when permitted; and requesting real-time permission from the overseeing device when user device action is restricted.

The techniques described herein, therefore, provide for granular administrator approval of user commands and actions in remote access sessions. Accordingly, the techniques herein provide implementation of real-time granular admin approval of user behavior during remote access sessions by intercepting user actions and determining whether to allow such actions or restrict such actions until overseeing admin approval is received. Further, the techniques described herein allow for granular administrator approval of user commands and actions in remote access sessions without sacrificing any level of security. Moreover, the techniques herein allow for granular administrator approval of user commands and actions in remote access sessions that immediately improves speed, simplicity, and ease of use, while also laying the groundwork for continued optimization and improvement.

Illustratively, the techniques described herein may be performed by hardware, software, and/or firmware, (e.g., an "apparatus") such as in accordance with the process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

providing, by a device, a remote access session to a remote device for both a user device and an overseeing device to manage the remote device, the providing including:

causing display of, via the user device, a view of an interface associated with the remote device; and causing display of, via the overseeing device, the view of the interface associated with the remote device;

determining, by the device, a first action that the user device is allowed to perform on the remote device in the remote access session and a second action to perform on the remote device in the remote access session that requires approval from the overseeing device;

allowing, by the device, the first action to be performed by the user device when requested; and performing an approval process, by the device, to facilitate real-time permission from the overseeing device when the second action is requested, the approval process including causing display of, via the overseeing device, enhanced contextual information overlaid on the view of the interface, the enhanced contextual information including an indicator related to the second action and an indicator to approve or deny the second action.

2. The method of claim 1, further comprising:

enabling the second action to be performed in response to receiving a communication regarding approval from the overseeing device; and blocking the second action in response to receiving a communication regarding denial from.

3. The method of claim 1, wherein the enhanced contextual information includes a banner that provides information regarding movements performed by the user device or actions performed by the user device, or both.

4. The method of claim 1, wherein the enhanced contextual information includes visual indicators or textual indications, or both, of actions performed by the user device.

5. The method of claim 1, wherein the enhanced contextual information includes a historical account of past actions performed by the user device.

6. The method of claim 1, wherein the enhanced contextual information is selected from a group consisting of: colored dots for clicks, keyboard commands, keyboard shortcuts, mouse drags, mouse actions, and information on actions inputted to the user device.

7. The method of claim 1, wherein the first action includes keyboard actions performed by the user device, mouse drags performed by the user device, or both.

8. The method of claim 1, wherein the second action is selected from a group consisting of: a type of mouse click input, an instruction to submit a command, an instruction to execute a command, an instruction to start a program, an instruction to stop a program, an instruction to edit a file, and an instruction to submit a form.

9. The method of claim 1, wherein the real-time permission from the overseeing device is selected from a group consisting of: a user of the overseeing device performing a mouse click operation, a user of the overseeing device performing a key stroke operation, a user of the overseeing device selecting an approve action, and a user of the overseeing device selecting a deny action.

10. The method of claim 1, wherein the first action and the second action are based in part on administrator-defined rules.

11. The method of claim 1, wherein the first action and the second action are based in part on a machine learning model that is trained on approvals and denials of requested permissions over time.

12. An apparatus, comprising:

one or more network interfaces to communicate with a network;

a processor coupled to the one or more network interfaces; and a memory configured to store instructions that, when executed by the processor, configure the processor to:

cause display of, via a user device, a view of an interface associated with a remote access session to manage a remote device;

cause display of, via an overseeing device, the view of the interface;

determine a first action that the user device is allowed to perform on the remote device in the remote access session and a second action to perform on the remote device in the remote access session that requires approval from the overseeing device;

allow the first action to be performed by the user device when requested; and perform an approval process to facilitate real-time permission from the overseeing device when the second action is requested, the approval process including causing display of, via the overseeing device, enhanced contextual information overlaid on the view of the interface, the enhanced contextual information including an indicator related to the second action and an indicator to approve or deny the second action.

13. The apparatus of claim 12, wherein the enhanced contextual information includes a banner that provides information regarding movements performed by the user device or actions performed by the user device, or both.

14. The apparatus of claim 12, wherein the enhanced contextual information includes visual indicators or textual indications, or both, of actions performed by the user device.

15. The apparatus of claim 12, wherein the enhanced contextual information includes a historical account of past actions performed by the user device.

16. The apparatus of claim 12, wherein the enhanced contextual information is selected from a group consisting of: colored dots for clicks, keyboard commands, keyboard shortcuts, mouse drags, mouse actions, and information on actions inputted to the user device.

17. The apparatus of claim 12, wherein the second action is selected from a group consisting of: a type of mouse click input, an instruction to submit a command, an instruction to execute a command, an instruction to start a program, an instruction to stop a program, an instruction to edit a file, and an instruction to submit a form.

18. A tangible, non-transitory, computer-readable medium storing program instructions that cause a device to execute a process comprising:

providing, via a user device, a view of an interface associated with a remote access session to manage a remote device;

providing, via an overseeing device, the view of the interface;

determining a first action that the user device is allowed to perform on the remote device in the remote access session and a second action to perform on the remote device in the remote access session that requires approval from the overseeing device;

allowing the first action to be performed by the user device when requested; and performing an approval process to facilitate real-time permission from the overseeing device when the second action is requested, the approval process including providing, via the overseeing device, enhanced contextual information overlaid on the view of the interface, the enhanced contextual information including an indicator related to the second action and an indicator to approve or deny the second action.

19. The tangible, non-transitory, computer-readable medium of claim 18, wherein the enhanced contextual information includes indicates movements of a pointer of the user device.

20. The tangible, non-transitory, computer-readable medium of claim 18, wherein the enhanced contextual information indicates past actions performed by the user device.

* * * * *